(12) United States Patent
Hossick-Schott (10) Patent No.: US 7,474,521 B2
(45) Date of Patent: Jan. 6, 2009

(54) HIGH ENERGY DENSITY CAPACITORS AND METHOD OF MANUFACTURING

(75) Inventor: Joachim Hossick-Schott, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 135 days.

(21) Appl. No.: 11/364,673

(22) Filed: Feb. 28, 2006

(65) Prior Publication Data

US 2007/0188980 A1    Aug. 16, 2007

(51) Int. Cl.
  *H01G 9/10*  (2006.01)
  *H05K 5/06*  (2006.01)
(52) U.S. Cl. ............... 361/518; 361/519; 29/25.03
(58) Field of Classification Search ......... 361/508, 361/511–512, 516, 517–521; 29/25.03
  See application file for complete search history.

(56) References Cited

U.S. PATENT DOCUMENTS

| | | | |
|---|---|---|---|
| 4,267,565 A | 5/1981 | Puppolo et al. | |
| 6,802,951 B2 | 10/2004 | Hossick-Schott | |
| 6,919,240 B2 | 7/2005 | Uzawa et al. | |
| 7,256,981 B2 * | 8/2007 | Kosuda et al. | ............... 361/502 |
| 2004/0134874 A1 | 7/2004 | Hossick-Schott | |
| 2005/0090108 A1 | 4/2005 | Hossick-Schott | |

FOREIGN PATENT DOCUMENTS

| | | |
|---|---|---|
| WO | WO0016352 A | 3/2000 |
| WO | WO0141232 A | 6/2001 |
| WO | WO0203406 A | 1/2002 |

OTHER PUBLICATIONS

International Search Report, PCTUS/2007/062398, Nov. 16, 2007, 5 Pages.

* cited by examiner

*Primary Examiner*—Eric Thomas
(74) *Attorney, Agent, or Firm*—Carol F. Barry (57) ABSTRACT

A capacitor including a flexible case and method for manufacturing the same are provided. The capacitor includes an electrode assembly encased in a sealed flexible case. The electrode assembly includes an anode formed from a high surface area valve metal and a cathode operatively positioned relative to the anode. The flexible case may conform to an exterior contour of the electrode assembly.

29 Claims, 9 Drawing Sheets

HIGH ENERGY DENSITY CAPACITORS AND METHOD OF MANUFACTURING

TECHNICAL FIELD

The invention relates generally to capacitors, and, in particular, to electrolytic capacitors containing valve metal anodes including a flexible case and methods for making the same.

BACKGROUND

Electrolytic capacitors are typically provided with a metal encasement for enclosing an anode, cathode, liquid electrolyte and a separator material positioned between the anode and cathode. The metal encasement is provided with feedthroughs through which the anode and cathode leads extend to facilitate electrical connection to other circuit components. The encasement also includes a fill port to accommodate filling the capacitor with a liquid electrolyte. The encasement typically includes a case and a cover that is welded to the case to hermetically seal the capacitor.

Electronic devices, particularly implantable medical devices, are becoming physically smaller, often with increased functionality. Accordingly, it is desirable to reduce the internal space required for capacitors included in such devices.

Some degree of packaging inefficiency is generally associated with a metal encasement. The metal encasement may not conform to the space available for the capacitor formed by the contours of the electronic device housing and other internal components. Additional features of the encasement such as the feedthroughs and fill port can require additional space and a minimum encasement thickness. A header space is often provided to accommodate additional features as well as facilitate welding of the cover to the case.

DETAILED DESCRIPTION

In the following description, references are made to illustrative embodiments for carrying out the invention. It is understood that other embodiments may be utilized without departing from the scope of the invention.

For purposes of clarity, the same reference numbers are used in the drawings to identify similar elements. The drawings are provided to illustrate various embodiments of the invention and are not drawn to scale.

Figure 1:
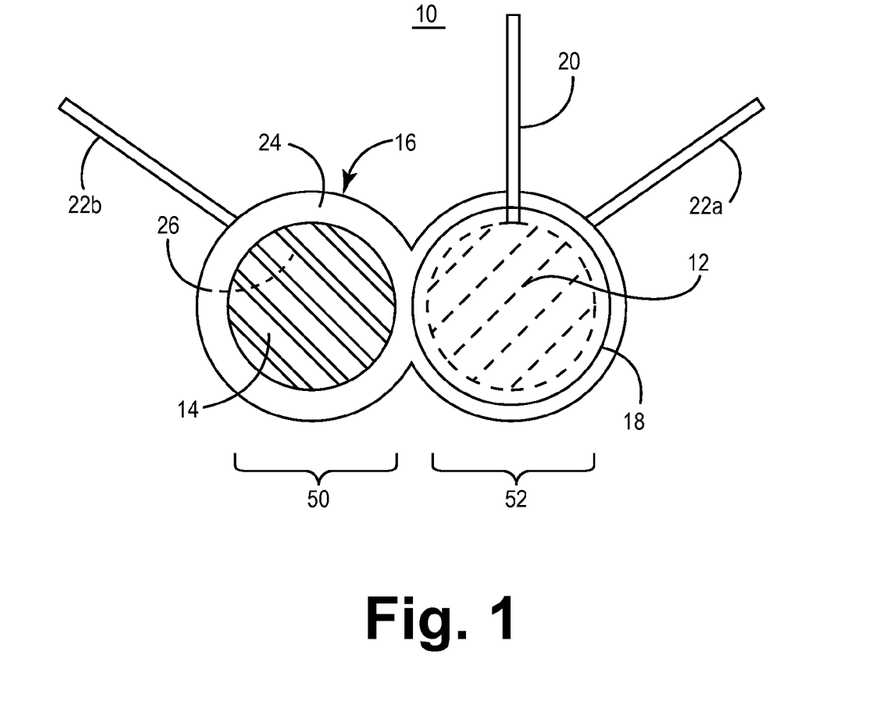
FIG. 1 is a top view depicting a partially-assembled electrode assembly for use in a high-energy density capacitor.

FIG. 1 is a top view depicting a partially-assembled electrode assembly for use in a high-energy density capacitor. An anode 12 is provided as a porous "slug" or "pellet" type anode formed from a pressed, sintered and formed valve metal powder. For example, anode 12 may be formed from tantalum or niobium powder. Anode 12 could also be provided as a stack of die-cut, porous sheets, for example etched Al sheets. All anodes are coated with a dielectric so as to hold electronic charge at high potential differences with low leakage currents.

Anode 12 is shown having a generally uniform, cylindrical shape, however, anode 12 may be provided with other geometries having variable contours or surfaces. Mold parts used to form anode 12 may have convex, concave irregular, curved or geometric features formed therein to impart a desired shape to anode 12. The selected valve metal is pressed into a desired shape in a mold and heated in a pressure vacuum. Valve metal anodes having various shapes and surfaces and methods of manufacture are generally disclosed in U.S. Pat. Pub. No. 2004/0134874, hereby incorporated herein by reference in its entirety.

The formed anode 12 is typically anodized in an electrochemical process involving immersing the anode in an anodizing electrolyte and applying an electrical formation potential to grow an anodic oxide layer to a target thickness.

Methods for anodizing valve metal anodes of the porous slug type are generally taught in U.S. Pat. No. 6,802,951, hereby incorporated herein by reference in its entirety.

Slug-type anode 12 is typically provided as a single anode. An electrically insulated anode lead 20 extends from anode 12. Anode lead 20 is typically pressed into anode 12 at the time that anode 12 is formed. Further processing of the anode will depend upon the choice of electrolyte, a liquid electrolytic or a solid polymeric electrolyte. The use of a solid polymeric electrolyte will be further described below. If a liquid electrolyte is used, anode lead 20 is electrically insulated using a sleeve or tube formed from an insulating material that is non-reactive with the capacitor cell electrolyte, such as polyethylene, polytetrafluoroethylene, polyvinylidene fluoride, or other fluoropolymers.

Anode 12 is wrapped in a separator 18. Separator 18 is disposed between anode 12 and cathode 14 to prevent internal electrical short circuit conditions while allowing sufficient movement of a liquid electrolyte within the capacitor. Separator 18 may be formed from one or more layers of a paper material or impregnated paper material such as kraft paper or manila paper. Separator materials may alternatively be formed from one or more layers of a porous polymeric material, such as polypropylene or PTFE, or fabric gauze material. Separator 18 may be an elongated sheet of one or more layers of separator material or formed into a pouch or "envelope" for wrapping around anode 12. In some embodiments, separator 18 is sealed to enclose anode 12.

The cathode 14 is provided as a carbon material deposited on a substrate 16. Substrate 16 includes an outer surface 26 and an inner surface 24.

Substrate 16 is depicted as a single piece of material having a "left-hand" portion 50 and a "right-hand" portion 52. Substrate 16 is folded over anode 12 in a "clam-shell" manner to position cathode 14 adjacent to anode 12, with separator 18 interposed there between. A carbonaceous material is deposited on inner surface 24 of both the left hand portion 50 and right hand portion 52 of substrate 16 to provide cathode material on both sides of anode 12 (separated by separator 18). Alternatively, substrate 16 may be provided as two separate halves, each having cathode material deposited on an inner surface, and each half stacked with the separator-wrapped anode 12 positioned there between. In alternate embodiments, other cathode materials may be selected for deposition on substrate 16, for example ruthenium oxide.

Cathode substrate 16 is provided as a thin flexible, electrically conductive material, such as a foil or a woven or non-woven mesh. Appropriate materials for substrate 16 include, but are not limited to, titanium, aluminum, nickel, tantalum, niobium, or alloys thereof. Substrate 16 may alternatively be formed from a conductive polymer. Substrate 16 may be formed to incorporate a cathode lead extension 22a extending there from. In some embodiments, a second cathode lead extension 22b is provided extending from the left hand portion 50 such that when substrate 16 is folded over anode 12, cathode lead extension 22a and cathode lead extension 22b are aligned and may be twisted or pressed together to form a cathode lead. Alternatively, a cathode lead may be electrically coupled, for example spot welded, to substrate 16.

The carbon material used to from cathode 14 may be printed, stamped, or pressed, onto substrate 16 or applied using laser deposition, chemical vapor deposition or any other appropriate method. Formation of cathode 14 on substrate 16 may include applying more than one layer of carbon-containing material and may include an annealing step. The annealing step may be used to promote adherence of cathode 14 to substrate 16, form a metal carbide with the underlying metal substrate 16, and/or vaporize any solvent or pyrolize any polymer present in the carbon source.

The carbon source may include any form of carbon, including graphite, a carbon polymorph, carbon black, and carbon nanotube material. The carbon source is provided in any medium suitable for the selected deposition process, such as an ink, ribbon, powder, solution, or polymeric material. Materials and techniques used for depositing a carbon coating onto a metallic substrate are generally disclosed in U.S. Pat. Pub. No. 2005/0090108, hereby incorporated herein by reference in its entirety. The total amount of the anode and cathode material required in the cell will depend on the energy density, volume, voltage, current, energy output, and other requirements of the cell for a particular application.

Figure 2:
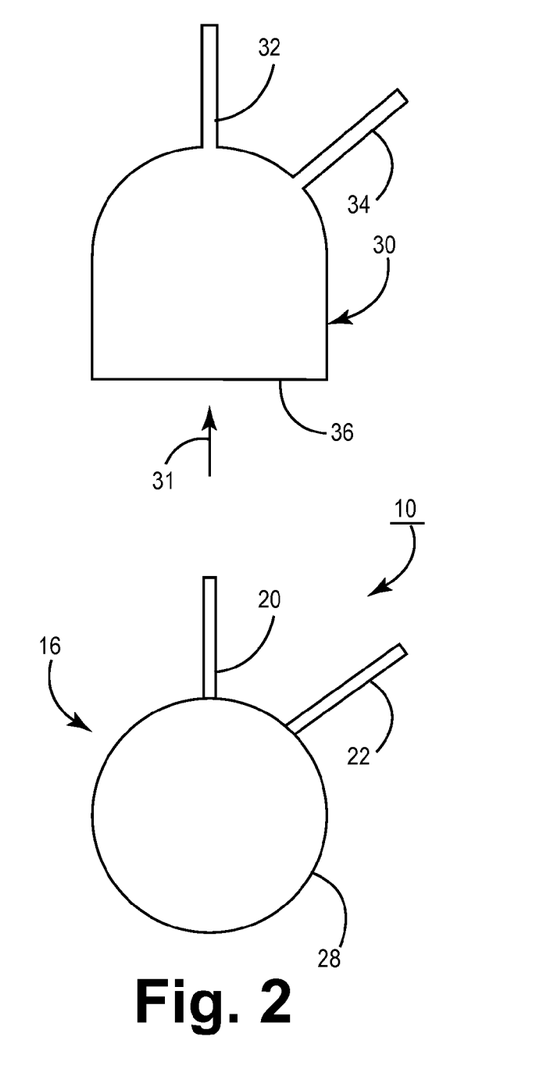
FIG. 2 is a top view of the fully-assembled electrode assembly shown in FIG. 1 and a flexible case for encasing the electrode assembly.

FIG. 2 is a top view of the electrode assembly 10 and a flexible case 30.

The completed electrode assembly 10 is depicted with substrate 16 positioned around the anode 12 wrapped in separator 18 (as shown in FIG. 1), so as to operatively position the cathode 14 (shown in FIG. 1) adjacent to anode 12. Insulated anode lead 20 and a cathode lead 22 extend from the respective electrodes. Insulation on cathode lead 22 is optional.

A flexible case 30 is adapted to receive electrode assembly 10. In the embodiment shown, flexible case 30 is shown as a pouch or envelope having an open side 36 for receiving electrode assembly 10. Flexible case 30 may alternatively be formed in a clam-shell configuration that is folded over electrode assembly 10 or in two pieces that are stacked with electrode assembly 10 positioned there between and then sealed along all borders. Flexible case 30 is formed from a leak-proof, conformable material that is non-reactive with the selected electrolyte to be used in the cell. Appropriate case materials include, but are not limited to, latex, polypropylene, polyethylene, polytetrafluoroethylene, polyvinylidene fluoride, or other fluoropolymers and combinations thereof. The thickness of case 30 is selected to provide the durability required for a particular application to prevent puncture, tearing, or rupture of case 30 during manufacturing of the capacitor cell, during handling of the cell in subsequent electronic device assembly processes, and throughout the expected functioning life of the cell. Case 30 is kept as thin as possible while meeting application specific durability requirements in order to provide a highly volumetrically efficient capacitor cell. In one example, the case may be formed of a flexible material on the order of 10 mil in thickness.

Electrode assembly 10 is inserted into flexible case 30 as indicated by arrow 31. Flexible case 30 is provided with an anode lead sleeve 32 and a cathode lead sleeve 34. While the anode lead 20 and cathode lead 22, and corresponding anode lead sleeve 32 and cathode lead sleeve 34, are shown having a particular orientation with respect to the electrode assembly 10, it should be apparent to a skilled artisan that numerous orientations or configurations are possible. The anode and cathode lead orientations will be design choices associated with the arrangement of other electronic circuitry used with the capacitor cell and the required electrical connections to be made to the capacitor cell.

Figure 3:
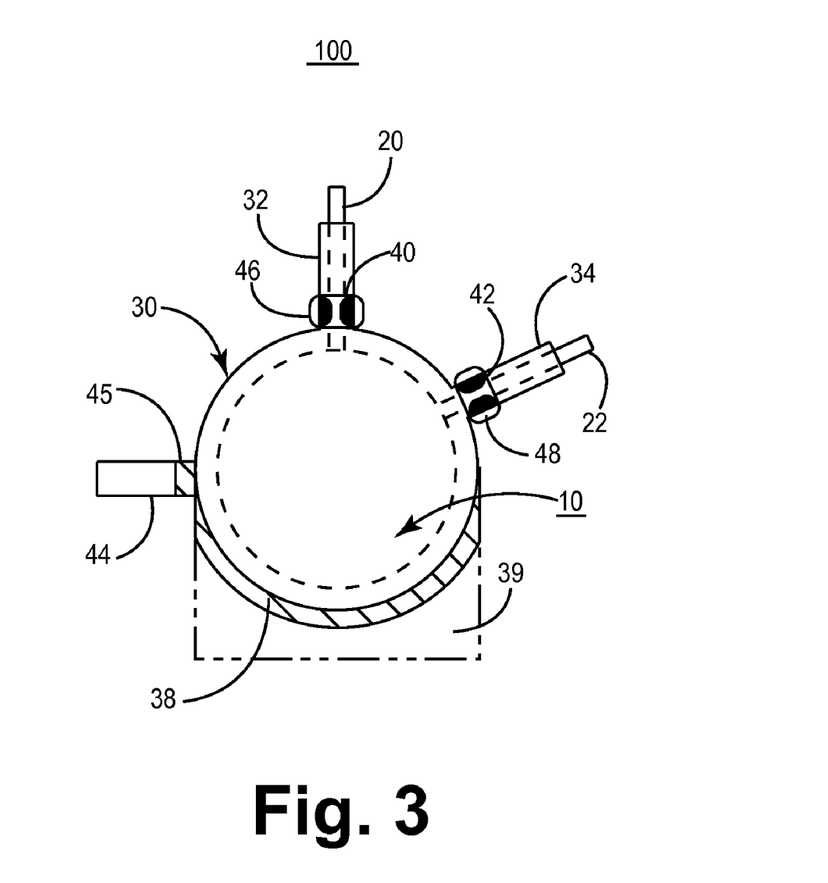
FIG. 3 is a top plan view of a capacitor cell including a flexible case.

FIG. 3 is a top plan view of the assembled capacitor cell including a flexible case. After inserting electrode assembly 10 into flexible case 30, case 30 may be filled with a liquid electrolyte. Flexible case 30 is hermetically sealed along seal area 38. Flexible case 30 is typically sealed using heat, though other methods such as methods employing pressure or an adhesive may be used.

Any excess case material 39 remaining after sealing case 30 may be trimmed away.

Flexible case 30 is provided with a size and shape that generally corresponds to the outer dimensions of electrode assembly 10 to achieve high volumetric efficiency. In some embodiments, flexible case 30 is formed from an elastic material, such as Latex, such that it may be stretched over electrode assembly 10 and creates a tightly-fitting encasement that conforms to the geometry of electrode assembly 10. Flexible case 30 may alternatively be formed of a heat-shrinkable material such that after electrode assembly 10 is properly placed in case 30, application of heat causes case 30 to shrink and snugly conform to electrode assembly 10.

Seal 40 is provided between anode lead sleeve 32 and anode lead 20, and seal 42 is provided between cathode lead sleeve 34 are cathode lead 22. A hermetic seal is required in case a liquid electrolyte is being used. If a solid polymeric electrolyte is being used, a hermetic seal may not be required. Seals 40 and 42 may be formed along any portion of anode lead sleeve 32 and cathode lead sleeve 34, respectively. Seals 40 and 42 may be formed using sealing members 46 and 48, which may be provided as tie wraps, wires or other members adapted for tightly securing the anode and cathode lead sleeves 32 and 34 around the respective leads 20 and 22 to form hermetic seals 46 and 48.

Seals 40 and 42 may alternatively be formed by applying heat to seal and/or shrink the lead sleeves 32 and 34 around respective leads 20 and 22. Seals 40 and 42 may alternatively be formed by applying an adhesive or epoxy between the sleeves 32 and 34 and the respective leads 20 and 22.

In an embodiment requiring a liquid electrolyte, one of the lead sleeves 32 or 34 may be used to provide access for filling capacitor cell 100 with a liquid electrolyte. Alternatively, cell 100 may be filled with a liquid electrolyte through the same opening through which electrode assembly 10 is inserted, prior to sealing case 30 along seal area 38. Seal area 38 may be partially sealed leaving an opening for filling cell 100 with an electrolyte, the opening being sealed after electrolyte delivery is complete. In yet another embodiment, a fill sleeve 44 may be provided for delivering a fluid electrolyte into cell 100. Fill sleeve 44 is sealed along seal area 45 after filling is completed and any excess sleeve material may then be removed, as indicated by the dash-dot line.

Manufacture of capacitor cell 100 does not require welding as normally required in past practice for closing a metal case and cover and sealing fill ports or other openings of a metal capacitor cell encasement. A header space to accommodate welding of metal encasements and additional encasement features such as fill ports and insulated lead feedthroughs that increase the overall encasement volume are not required.

Figures 4A, 4B:
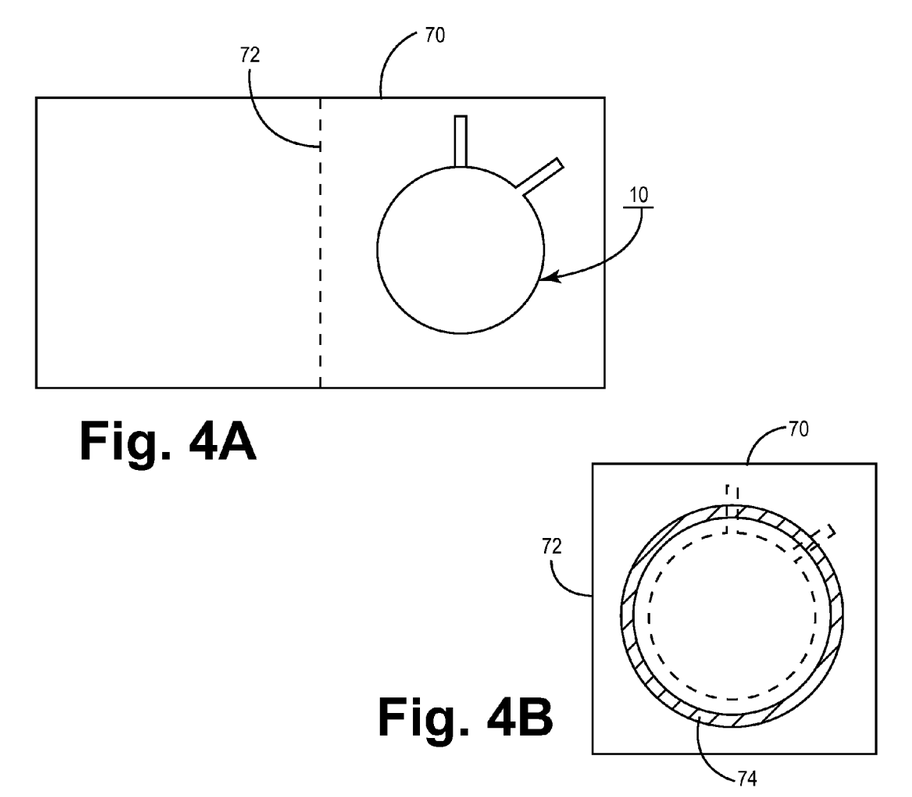
FIGS. 4A through 4C illustrate a method for encasing a capacitor cell including a flexible case according to an alternative embodiment of the invention.
Figure 4C:
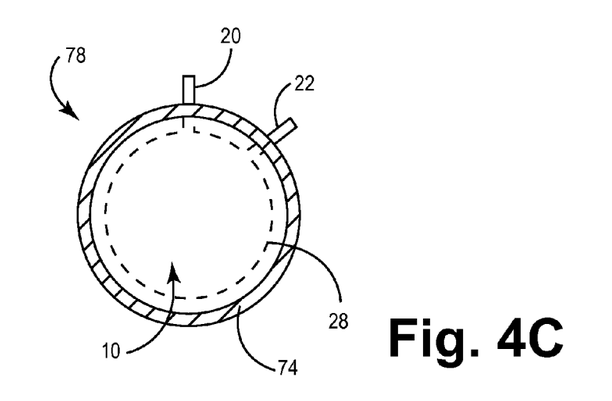

FIGS. 4A through 4C illustrate a method for encasing a capacitor cell including a flexible case according to an alternative embodiment of the invention.

In FIG. 4A, electrode assembly 10 is positioned on an elongated sheet 70 of case material, which is then folded along a fold line 72 over electrode assembly 10. As shown in FIG. 4B, the sheet 70 is hermetically sealed along a seal area 74 around electrode assembly 10. In FIG. 4C, the excess material of sheet 70 has trimmed away to from case 78, which is sealed on all sides of electrode assembly 10. Seal area 74 may extend over anode lead 20 and cathode lead 22 to form leak-proof seals around the leads 20 and 22. Alternatively, case 78 may be sealed around leads 20 and 22 in a separate step. When sheet 70 is provided as a heat-shrinkable material, a subsequent step of applying heat may be used to shrink case 78 to conform to the exterior contour 28 of electrode assembly 10, thereby forming a highly volumetrically efficient capacitor case.

Figure 5:
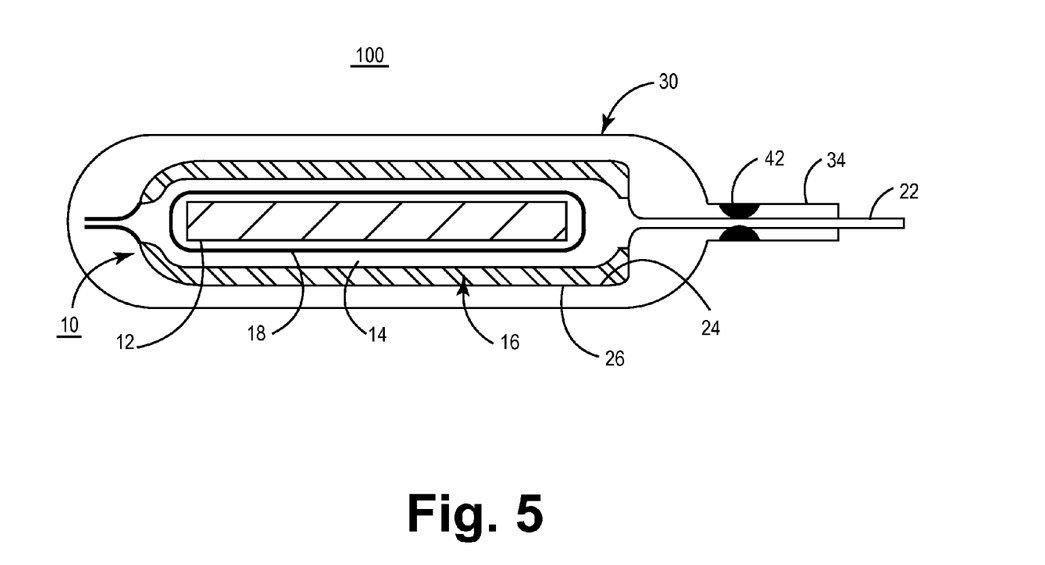
FIG. 5 is a side sectional view of a capacitor cell including a flexible case.

FIG. 5 is a side sectional view of a capacitor cell including a flexible case.

The anode 12 is wrapped by separator 18. Cathode 14 is deposited on substrate 16, and substrate 16 is positioned around separator 18 such that cathode 14 and anode 12 are operatively positioned relative to each other. The electrode assembly 10 is enclosed in flexible case 30, which is hermetically sealed as described above. Flexible case 30 is filled with a liquid electrolyte.

Figure 6:
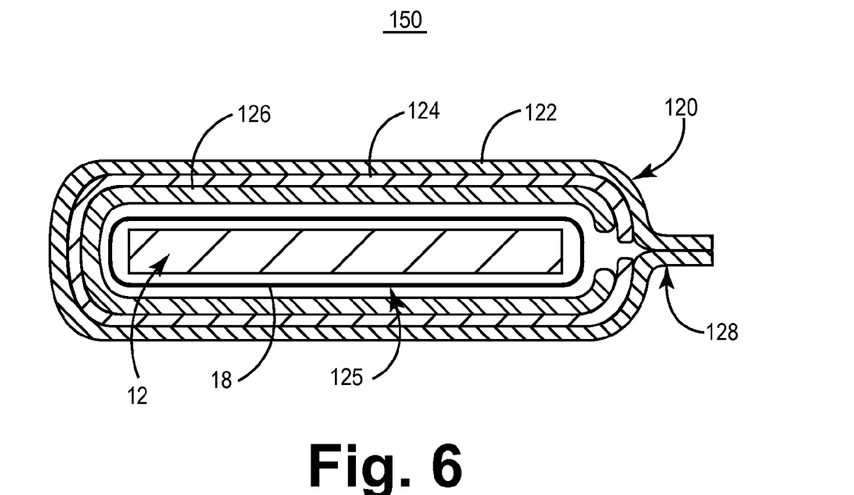
FIG. 6 is a side sectional view of an alternative capacitor cell including a flexible case.

FIG. 6 is a side sectional view of an alternative capacitor cell including a flexible case. In capacitor cell 150, flexible case 120 encases the anode 12 and cathode 126 and provides the substrate 124 on which cathode 126 is formed. Case 120 is provided as a laminate having at least two layers including an inner metallic inner layer 124 which forms the substrate for cathode 126. Cathode 126 is provided as a carbon containing material deposited on metallic inner layer 124 according to methods described previously. Metallic inner layer 124 is thin enough to maintain flexibility of case 120. Metallic inner layer 124 is laminated to a leak-proof, flexible outer layer 122 formed, for example, from latex, polypropylene, polyethylene, PTFE or combinations of these materials or other electrolytic resistant materials. Case 120 is generally sized to match the exterior contour 125 of anode 12, wrapped in separator 18 and is generally not highly elastic or heat-shrinkable since significant stretching or shrinking of case 120 may dislodge or breakaway portions of cathode 126 deposited on metallic inner layer 124. Case 120 is hermetically sealed along seal area 128. Seal area 128 may be provided without metallic inner layer 124 such that outer layer 126 can be hermetically sealed using thermal, pressure, adhesive or other appropriate sealing methods.

Figure 7:
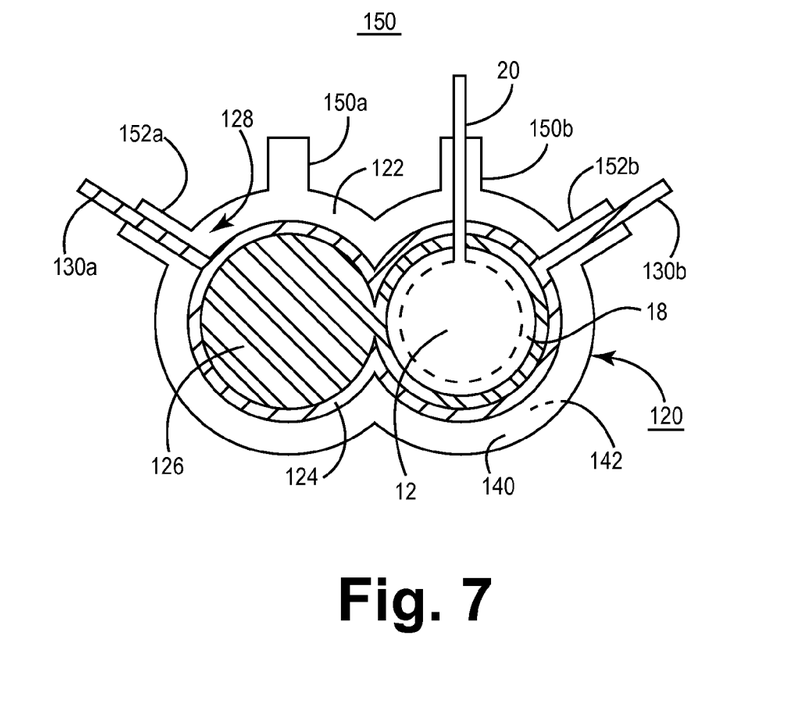
FIG. 7 is a top, open view of the capacitor cell shown in FIG. 6.

FIG. 7 is a top, open view of the capacitor cell shown in FIG. 6. Case 120 is depicted having a "clam shell" configuration for folding over anode 12, wrapped in a separator 18. Anode 12 is provided with an insulated anode lead 20 extending there from. Case 120 is formed from a flexible, laminated material including an outer layer 122 and metallic inner layer 124. Outer layer 122 is formed from a leak-proof, electrolyte-resistant flexible material. Outer layer 122 has an inner surface 140 and an outer surface 142. Metallic inner layer 124 is provided as a suitable foil or woven or non-woven mesh that is laminated onto inner surface 140. Suitable material for metallic inner layer 124 include titanium, aluminum, nickel, platinum, iridium or alloys thereof. Cathode 126 is deposited on the metallic inner layer 124. Metallic inner layer 124 may be formed with cathode lead extensions 130a and 130b, which become aligned when case 120 is folded over anode 12. Alternatively, a cathode lead may be welded to inner metallic layer 124.

In an alternate embodiment that includes a solid electrolyte, metallic inner layer 124 may be provided for contacting the solid electrolyte functioning as a cathode. A solid electrolyte cell will be described further below.

Case 120 is hermetically sealed along seal area 128, extending along the periphery of case 120. Outer layer 122 may optionally include anode lead sleeve extensions 150a and 150b and cathode lead sleeve extensions 152a and 152b. The sleeve extensions 150a, 150b, 152a and 152b become hermetically sealed around the respective anode lead 20 and cathode lead extensions 130a and 130b (forming a cathode lead) either during sealing along seal area 128 or in a separate sealing step as generally described above.

As described previously, the anode or cathode sleeve extensions may serve as a fill sleeve for delivering a liquid electrolyte. Alternatively, a separate fill sleeve may be provided or the liquid electrolyte may be injected through the case using a hypodermic needle. The fill sleeve or puncture formed by a hypodermic needle are hermetically sealed after delivering the electrolyte into capacitor cell 150.

Figure 8:
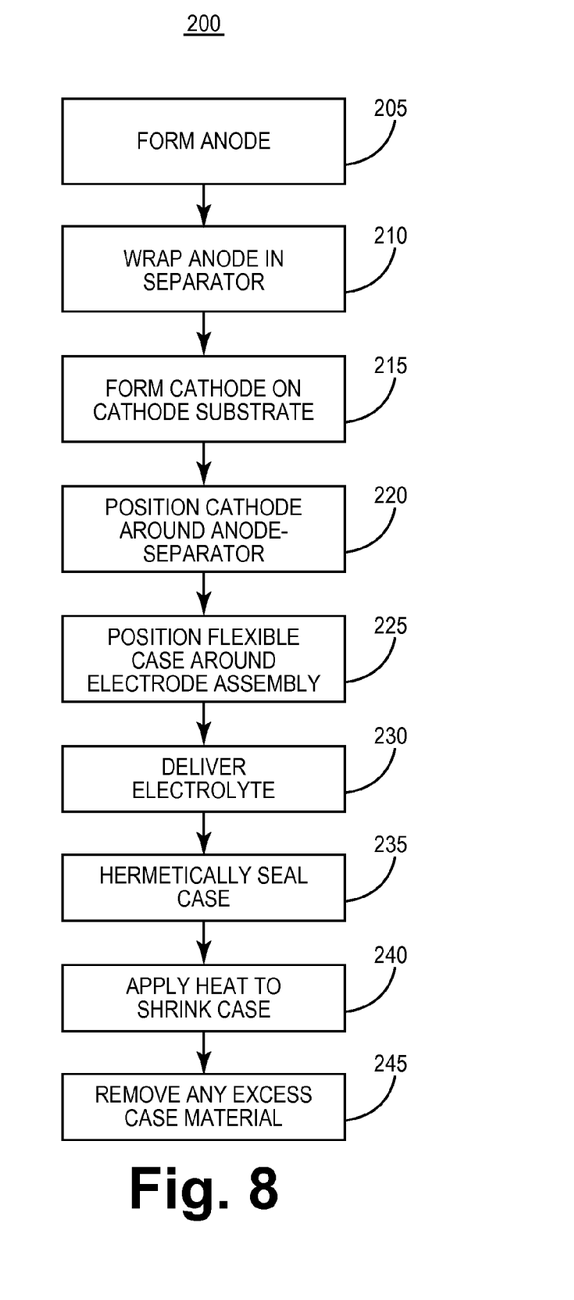
FIG. 8 is a flow chart summarizing steps included in a method for manufacturing a valve metal capacitor including a flexible case.

FIG. 8 is a flow chart summarizing steps included in a method for manufacturing a valve metal capacitor including a liquid electrolyte and a flexible case. At block 205, the valve metal anode is formed as a slug-type anode by pressing, sintering a selected valve metal powder. The anode could also be formed from a stack of high surface area sheets, for example etched Al sheets.

All anode representations are coated with a dielectric. The anode is wrapped in a separator at block 210. If a liquid electrolyte design is used, a carbon-containing cathode or other appropriate cathode material is formed on a cathode substrate at block 215. In one embodiment, the cathode substrate is provided as a metallic foil or a woven or non-woven metallic mesh material that is wrapped around the anode-separator subassembly at block 220. The flexible case is then positioned around the electrode assembly, including the anode, cathode and separator, at block 225. The flexible case may be provided as a pouch or envelope that the electrode assembly is inserted into. The flexible case may alternatively be provided as sheet of material that is folded over the electrode assembly or two sheets of material stacked with the electrode assembly positioned there between.

In another embodiment requiring a liquid electrolyte fill, the cathode substrate is provided as an inner metallic layer of a laminated case material such that the steps of positioning the cathode around the anode-separator subassembly (block 220) and positioning the flexible case around the electrode assembly (block 225) are achieved in a single step.

At block 230 the flexible case is filled with a liquid electrolyte, and at block 235 the case is hermetically sealed. In some embodiments, the flexible case may be partially sealed, the liquid electrolyte delivered, and then the case completely sealed. Sealing the flexible case may be performed in a single step or in multiple steps which may include sealing anode and cathode lead sleeves and sealing an opening through which the electrolyte has been delivered.

Sealing the flexible case may include applying heat, pressure, an adhesive and/or a sealing member such as a tie wrap, wire, or a heat shrinkable member.

An additional step of applying heat to the hermetically sealed case may be performed at block 240 to shrink the case to conform to the exterior contour of the electrode assembly when the case is fabricated from a heat-shrinkable material. Any excess case material may be removed at block 245.

Figure 9:
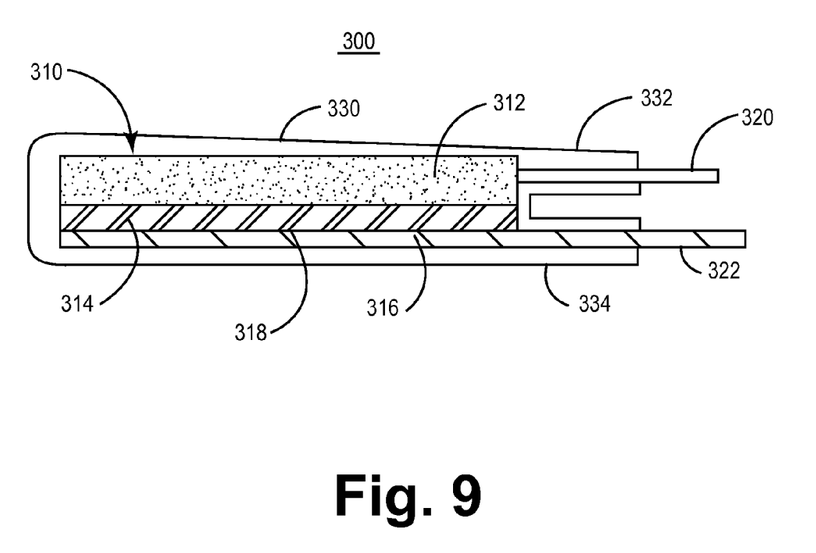
FIG. 9 is a side sectional view of an alternative embodiment of a valve metal capacitor having a solid electrolyte and a flexible case.

FIG. 9 is a side sectional view of an alternative embodiment of a valve metal capacitor having a solid electrolyte and a flexible case. Electrode assembly 310 includes a porous, slug-type, or stacked-plate-type valve metal anode 312 coupled to anode lead 320 as described previously. Anode lead 320 may not require insulation when used in a solid electrolyte cell 300. The formed porous anode 312 is impregnated with a liquid conductive polymer to form solid electrolyte 318 deposited in the pores of anode 314. Electrode contacting 314 is provided as a conductive material, such as silver and/or graphite paste, formed on a conductive substrate 316. A cathode lead 322 is electrically coupled to contacting 314 via substrate 316 to provide electrical connection to the solid electrolyte. The use of a solid polymeric electrolyte, such as PEDT (poly 3,4-ethylenedioxythiophene), replaces the liquid electrolyte and eliminates the need for a separate cathode. The solid polymeric electrolyte together with appropriate contacting provides the functionality of the electrolyte and the cathode. A separator material is also not necessary for separating the anode and cathode as described previously with regard to liquid electrolyte cells.

Figure 10:
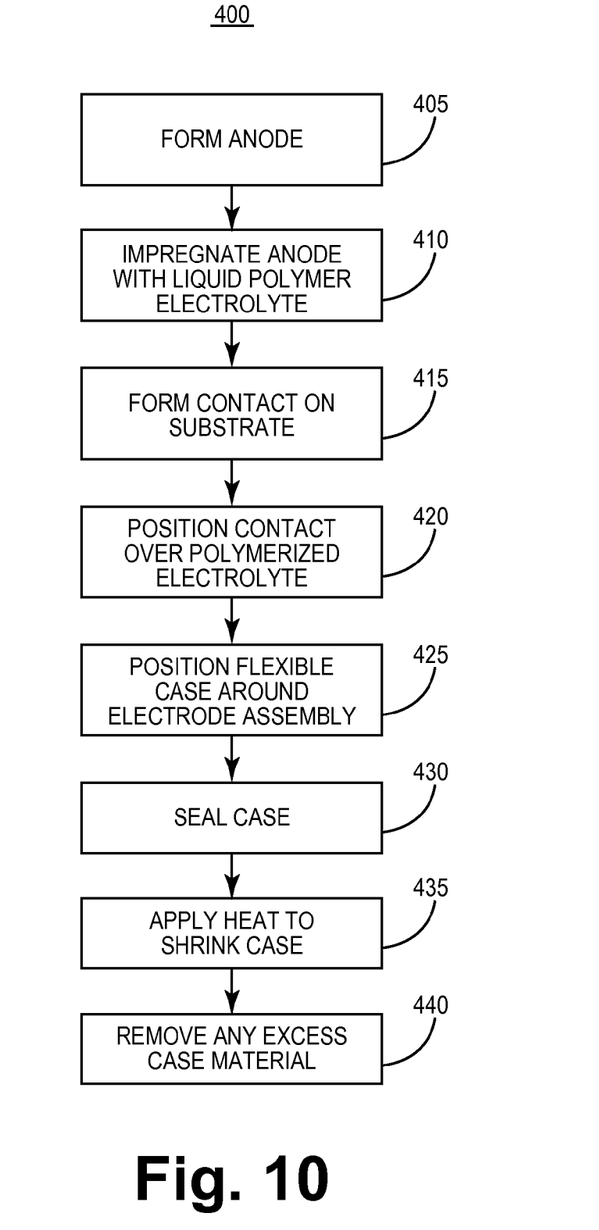
FIG. 10 is a flow chart summarizing a method for fabricating a valve metal capacitor having a solid electrolyte and flexible case.

FIG. 10 is a flow chart summarizing a method for fabricating a valve metal capacitor having a solid electrolyte and flexible case. The use of a solid electrolyte may simplify the construction of cell 300 in that liquid electrolyte filling is not required, and case 330 may not require hermetic sealing. At block 405, a porous or stacked-plate-type valve metal anode is formed as described previously. At block 410, the anode is filled with a liquid polymer electrolyte which, after polymerization, forms the solid electrolyte. At block 415, a conductive material is formed on a substrate for providing electrical contacting with the solid electrolyte. The contact is positioned over the polymerized electrolyte at block 420 to operatively couple the solid electrolyte with a cathode lead as shown in FIG. 9.

A block 425 the flexible case is positioned around the electrode assembly, including the substrate and contact formed thereon. The flexible case is sealed at block 430. Additional steps of applying heat to shrink the flexible case and trimming away any excess case material may be performed at block 435 and 44.

Thus, a valve metal capacitor including a flexible case and method for manufacturing the same have been presented in the foregoing description with reference to specific embodiments. It is appreciated that various modifications to the referenced embodiments may be made without departing from the scope of the invention as set forth in the following claims.

The invention claimed is:

1. A capacitor, comprising:
   an electrode assembly having an exterior contour; the electrode assembly comprising an anode formed from a high surface area valve metal and a cathode operatively positioned relative to the anode; and
   a flexible case for encasing the electrode assembly, the flexible case being hermetically sealed,
   the anode being a porous slug of a pressed and sintered valve metal powder.

2. The capacitor of claim 1 wherein the flexible case conforms to the exterior contour of the electrode assembly.

3. The capacitor of claim 1 wherein the flexible case includes one of an elastic material and a heat-shrinkable material.

4. The capacitor of claim 1 wherein the flexible case includes any of polypropylene, polyethylene, latex and a fluoropolymer.

5. The capacitor of claim 1 wherein the cathode includes a solid polymer.

6. The capacitor of claim 5, wherein the solid polymer being impregnated in the formed anode.

7. The capacitor of claim 5 further including a conductive contact operatively positioned relative to the solid polymer and a cathode lead electrically coupled to the conductive contact and extending therefrom.

8. The capacitor of claim 1 wherein the cathode includes a cathode material deposited on a conductive substrate.

9. The capacitor of claim 8 wherein the conductive substrate includes any of a foil, a woven mesh, and a non-woven mesh.

10. The capacitor of claim 8 wherein the cathode substrate includes any of titanium, aluminum, tantalum, niobium, nickel and a conductive polymer.

11. The capacitor of claim 10 wherein the sealing member includes any of a tie wrap, a wire, a band, and a heat-shrinkable member.

12. The capacitor of claim 8 wherein the cathode substrate includes a cathode lead extending there from.

13. The capacitor of claim 8 wherein the flexible case includes a laminated material including a flexible outer layer and a metallic inner layer and wherein the metallic inner layer forms the cathode substrate.

14. The capacitor of claim 1 wherein the flexible case includes an anode lead sleeve and a cathode lead sleeve extending there from.

15. The capacitor of claim 1 wherein the flexible case being sealed using any of heat, pressure, an adhesive, and a sealing member.

16. The capacitor of claim 1 wherein the anode is formed as a slug-type anode.

17. A method for fabricating a capacitor, comprising:
   forming an anode, the anode being formed from a valve metal powder sintered and pressed into a porous slug;
   forming a cathode in operative relation to the anode, the anode and cathode forming an electrode assembly;
   positioning the electrode assembly in a flexible case; and
   sealing the flexible case.

18. The method of claim 17 wherein forming the cathode comprises depositing a cathode material on a cathode substrate.

19. The method of claim 18 further including filling the flexible case with a liquid electrolyte.

20. The method of claim 17 wherein forming the cathode includes impregnating the anode with a liquid conductive polymer.

21. The method of claim 17 wherein the flexible case includes one of an elastic material and a heat-shrinkable material.

22. The method of claim 17 further including inserting an anode lead through an anode lead sleeve and inserting a cathode lead through a cathode lead sleeve, the anode and cathode lead sleeves being included on the flexible case, and sealing the anode and cathode lead sleeves.

23. The method of claim 17 further including applying heat to shrink the flexible case to conform to an exterior contour of the electrode assembly.

24. The method of claim 17 wherein sealing the case includes any of applying heat, applying pressure, applying an adhesive, applying a sealing member.

25. The method of claim 17 wherein the flexible case being formed from a laminate including an outer flexible layer and an inner metallic layer, the inner metallic layer forming a substrate for one of a cathode and a cathode contact.

26. The method of claim 17 further including removing excess case material after sealing the flexible case.

27. The method of claim 17 wherein forming the anode includes forming a slug-type pellet of valve metal material.

28. A capacitor, comprising:
an electrode assembly having an exterior contour; the electrode assembly comprising an anode formed from a high surface area valve metal and a cathode operatively positioned relative to the anode and at least one lead extending from one of the anode and the cathode; and
a flexible case for encasing the electrode assembly, the flexible case being hermetically sealed,
the flexible case comprising a lead sleeve extending therefrom for receiving the at least one lead.

29. A capacitor, comprising:
an electrode assembly having an exterior contour; the electrode assembly comprising an anode formed from a high surface area valve metal and a cathode operatively positioned relative to the anode; and
a flexible case for encasing the electrode assembly, the flexible case being hermetically sealed and being tightly-fitting to snugly conform to the exterior contour of the electrode assembly.

* * * * *